United States Patent
Benet Rajkumar et al.

(10) Patent No.: US 12,305,553 B2
(45) Date of Patent: May 20, 2025

(54) CATALYTIC WALL FLOW FILTER

(71) Applicant: Johnson Matthey Public Limited Company, London (GB)

(72) Inventors: Brenda Benet Rajkumar, Royston (GB); Fezile Lakadamyali, Wayne, PA (US); John Turner, Royson (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 18/432,154

(22) Filed: Feb. 5, 2024

(65) Prior Publication Data

US 2024/0287923 A1 Aug. 29, 2024

Related U.S. Application Data

(60) Provisional application No. 63/486,492, filed on Feb. 23, 2023.

(51) Int. Cl.
| | |
|---|---|
| *F01N 3/035* | (2006.01) |
| *B01D 53/94* | (2006.01) |
| *B01J 23/44* | (2006.01) |
| *B01J 23/46* | (2006.01) |
| *B01J 23/63* | (2006.01) |
| *B01J 35/00* | (2024.01) |
| *F01N 3/10* | (2006.01) |
| *F01N 3/28* | (2006.01) |

(52) U.S. Cl.
CPC ........... *F01N 3/035* (2013.01); *B01D 53/945* (2013.01); *B01D 53/9477* (2013.01); *B01J 23/44* (2013.01); *B01J 23/464* (2013.01); *B01J 23/63* (2013.01); *B01J 35/19* (2024.01); *F01N 3/101* (2013.01); *F01N 3/2803* (2013.01); *B01D 2255/1023* (2013.01); *B01D 2255/1025* (2013.01); *B01D 2255/407* (2013.01); *B01D 2255/908* (2013.01); *B01D 2255/9155* (2013.01); *F01N 2330/30* (2013.01); *F01N 2370/02* (2013.01); *F01N 2510/0684* (2013.01)

(58) Field of Classification Search
CPC . F01N 3/035; F01N 3/101; B01J 23/44; B01J 23/464; B01D 2255/1023; B01D 2255/1025; B01D 2255/9155
See application file for complete search history.

(56) References Cited

U.S. PATENT DOCUMENTS

| | | | |
|---|---|---|---|
| 10,625,243 B2 | 4/2020 | Clowes | |
| 2009/0193796 A1 | 8/2009 | Wei et al. | |
| 2014/0044626 A1 | 2/2014 | Greenwell | |
| 2014/0301924 A1 | 10/2014 | Morgan | |
| 2017/0296969 A1 | 10/2017 | Ohashi | |
| 2019/0168162 A1 | 6/2019 | Ivukin | |
| 2019/0193057 A1* | 6/2019 | Hoshino | B01J 23/464 |
| 2020/0353410 A1 | 11/2020 | Waltz | |
| 2020/0362738 A1* | 11/2020 | Schoenhaber | F01N 3/035 |
| 2021/0079822 A1* | 3/2021 | Schoenhaber | F01N 3/28 |

FOREIGN PATENT DOCUMENTS

| | | | | |
|---|---|---|---|---|
| CN | 105964253 A | * | 9/2016 | ........ B01D 53/945 |
| CN | 105964253 B | | 4/2019 | |
| DE | 202017007047 U1 | * | 6/2019 | |
| WO | 9947260 A1 | | 9/1999 | |
| WO | 2022071926 A1 | | 4/2022 | |

* cited by examiner

*Primary Examiner* — Laert Dounis

(57) ABSTRACT

A catalytic wall-flow filter for exhaust gas from a gasoline engine is disclosed. The catalytic wall-flow filter comprises a wall-flow filter substrate having porous walls and a first face and a second face defining a longitudinal direction therebetween and first and second pluralities of channels extending in the longitudinal direction. The first plurality of channels is open at the first face and closed at the second face, and the second plurality of channels is open at the second face and closed at the first face. The filter comprises a first TWC coating comprising a first PGM composition, a first oxygen storage capacity (OSC) material, and a first inorganic support; and a second TWC coating comprising a second PGM composition, a second OSC material, and a second inorganic support.

18 Claims, No Drawings

CATALYTIC WALL FLOW FILTER

TECHNICAL FIELD

The present invention relates to a catalytic wall-flow filter suitable for use in a vehicular automobile emission treatment system, in particular an emission treatment system for a positive ignition internal combustion engine, such as a gasoline spark ignition engine. The catalytic wall-flow filter is effective in reducing HC, CO, NOx, and particulate matter emissions.

BACKGROUND OF THE INVENTION

Gasoline particulate filters (GPF) are an emission aftertreatment technology developed to control particulate emissions from gasoline direct injection (GDI) engines.

The population of GDI vehicles has been increasing, driven by $CO_2$ and/or fuel economy requirements. In 2016, an estimated 60% of new gasoline cars in Europe were GDI. The proportion of GDI vehicles has been also rapidly increasing in North America-within nine years after its first significant use in the market, GDI penetration has climbed to 48.5% of new light vehicle sales in the United States. Emissions from the growing GDI vehicle fleet are a public health concern and a potential major source of ambient particle pollution in highly populated urban areas.

Most early GPF applications included an uncoated GPF positioned downstream of a three-way catalyst (TWC). As the technology matured, GPFs have been also coated with a three-way catalyst. This catalyst-coated GPF configuration is sometimes referred to as the four-way catalyst. See, for example, U.S. Pat. No. 10,625,243B2, US 2020/0353410A1, US 2019/0168162A1, US 2009/0193796A1. However, the combination of the TWC coating on a filter body does introduce additional issues such as undue backpressure, and there are requirements for minimum CO, NOx and HC conversion properties. In addition, there are cost considerations with a need to provide the best possible balance of performance to cost.

Three-way catalysts are intended to catalyze three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. These three reactions occur most efficiently when the TWC receives exhaust gas from an engine running at or about the stoichiometric point. As is well known in the art, the quantity of carbon monoxide, unburned hydrocarbons and nitrogen oxides emitted when gasoline fuel is combusted in a positive ignition (e.g., spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces this stoichiometrically balanced exhaust gas composition is typically given as 14.7:1.

The active components in a typical TWC comprise one or both of platinum and palladium in combination with rhodium supported on a high surface area oxide, and an oxygen storage capacity (OSC) material.

Theoretically, it should be possible to achieve complete conversion of $O_2$, $NO_x$, CO and HC in a stoichiometrically balanced exhaust gas composition to $CO_2$, $H_2O$ and $N_2$ (and residual $O_2$) and this is the duty of the TWC. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda ($\lambda$) value of the exhaust gas, which can be defined according to the following equation:

$$\text{lambda}(\lambda) = (\text{actual engine air-to-fuel ratio})/(\text{stoichiometric air-to-fuel ratio})$$

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates.

It should be appreciated that the reduction of $NO_x$ to $N_2$ using a TWC is less efficient when the exhaust gas composition is lean or stoichiometric. Equally, the TWC is less able to oxidize CO and HC when the exhaust gas composition is rich. The challenge, therefore, is to maintain the composition of the exhaust gas flowing into the TWC at as close to the stoichiometric composition as possible. Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

When the exhaust gas composition is slightly rich of the set point, there is a need for a small amount of oxygen to consume the unreacted CO and HC, i.e., to make the reaction more stoichiometric. Conversely, when the exhaust gas goes slightly lean, the excess oxygen needs to be consumed. This was achieved by the development of OSC material that liberates or absorbs oxygen during the perturbations. The commonly used OSC material in modern TWCs is cerium oxide or a mixed oxide containing cerium, e.g., a CeZr mixed oxide.

There is a need to develop technologies to effectively convert CO, NOx and HC and to reduce particulate matters in exhaust gas from a gasoline engine.

SUMMARY OF THE INVENTION

One aspect of the present disclosure is directed to a catalytic wall-flow filter for exhaust gas from a gasoline engine, the catalytic wall-flow filter comprising:

a wall-flow filter substrate having porous walls and having a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face;

a first TWC coating in the first plurality of channels, the first TWC coating comprising a first PGM composition, a first oxygen storage capacity (OSC) material, and a first inorganic support;

a second TWC coating in the second plurality of channels, the second TWC coating comprising a second PGM composition, a second OSC material, and a second inorganic support;

wherein the first PGM composition comprises rhodium in an amount of 50 to 95 wt % relative to the total weight of the first PGM composition;

wherein the second PGM composition comprises palladium in an amount of 90 to 99 wt % relative to the total weight of the second PGM composition;

wherein the first TWC coating is coated from the first face;

wherein the second TWC coating is coated from the second face;

wherein the first face is an inlet face and the second face is an outlet face of the catalytic wall-flow filter.

Another aspect of the present disclosure is an emission treatment system for treating a flow of a combustion exhaust gas from gasoline direct injection engines, the system comprising the catalytic wall-flow filter as disclosed herein. Preferably the exhaust system comprises a TWC catalyst and the catalytic wall-flow monolith filter, wherein the TWC catalyst is upstream of the catalytic wall-flow monolith filter.

According to a further aspect, the invention provides a method of treating a combustion exhaust gas from a positive ignition internal combustion engine containing oxides of nitrogen, carbon monoxide, hydrocarbons, and particulate matter, which method comprising contacting the exhaust gas with the catalytic wall-flow filter as disclosed herein.

DETAILED DESCRIPTION OF THE INVENTION

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

One aspect of the present disclosure is directed to a catalytic wall-flow filter for exhaust gas from a gasoline engine, the catalytic wall-flow filter comprising:

a wall-flow filter substrate having porous walls and having a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face;

a first TWC coating in the first plurality of channels, the first TWC coating comprising a first PGM composition, a first oxygen storage capacity (OSC) material, and a first inorganic support;

a second TWC coating in the second plurality of channels, the second TWC coating comprising a second PGM composition, a second OSC material, and a second inorganic support;

wherein the first PGM composition comprises rhodium in an amount of 50 to 95 wt % relative to the total weight of the first PGM composition;

wherein the second PGM composition comprises palladium in an amount of 90 to 99 wt % relative to the total weight of the second PGM composition;

wherein the first TWC coating is coated from the first face;

wherein the second TWC coating is coated from the second face;

wherein the first face is an inlet face and the second face is an outlet face of the filter.

The wall-flow filter substrate can be a ceramic, e.g., silicon carbide, cordierite, aluminium nitride, silicon nitride, aluminium titanate, alumina, mullite, pollucite, or composites comprising segments of any two or more thereof. Cordierite, a magnesium aluminosilicate, and silicon carbide are particularly preferred.

The wall-flow filter substrate suitable for use in the present invention typically has a mean pore size of from 8 to 45 µm, for example 8 to 25 µm, or 10 to 20 µm. Pore size is well known in the art and appropriate measurement techniques are known to a person skilled in the art. The wall-flow filter substrate may have a porosity of 40 to 75%, such as 45 to 70%. The mean pore size may be determined using mercury porosimetry and x-ray tomography according to conventional methods.

The catalytic wall-flow filter comprises a first TWC coating in the first plurality of channels, the first TWC coating comprising a first PGM composition, a first oxygen storage capacity (OSC) material, and a first inorganic support.

The "PGM" as used herein refers to "platinum group metal." The term "platinum group metal" generally refers to a metal selected from the group consisting of Ru, Rh, Pd, Os, Ir and Pt.

The first PGM composition preferably comprises Rh and Pd. The first PGM composition may further comprises Pt.

The first PGM composition comprises Rh in an amount of 50 to 95 wt %, preferably 60 to 90 wt %, more preferably 65 to 85 wt %, even more preferably 70 to 80 wt % relative to the total weight of the first PGM composition.

The second PGM composition comprises palladium in an amount of 90 to 99 wt %, preferably 91 to 98 wt %, more preferably 92 to 97 wt %, even more preferably 93 to 96 wt % relative to the total weight of the second PGM composition. The second PGM composition preferably comprises Rh and Pd. The second PGM composition may further comprises Pt.

"Oxygen storage capacity" refers to the ability of materials used as oxygen storage capacity material in a catalyst composition to store oxygen at lean conditions and to release it at rich conditions.

The first OSC material and the second OSC material can be the same or different. The first OSC material and the second OSC material can each be a ceria or a mixed oxide comprising ceria. Preferably the first OSC material and the second OSC material each comprises a mixed oxide of cerium, zirconium; a mixed oxide of cerium, zirconium, and aluminium; a mixed oxide of cerium, zirconium, and neodymium; or a mixed oxide of cerium, zirconium and praseodymium. The term "mixed oxide" as used herein generally refers to a mixture of oxides in a single phase, as is conventionally known in the art.

The amount of the OSC material in the first TWC coating or the second TWC coating can each be from 5 to 90 wt %, preferably from 10 to 80 wt %, relative to the total weight of the coating.

In some embodiments, each of first OSC material and the second OSC material independently comprises an OSC derived from a CeZr mixed oxide sol having a D90 of less than 1.3 micron. The CeZr mixed oxide sol comprise a CeZr mixed oxide (CeZr mixed oxide particles or CeZr mixed oxide nanoparticles) dispersed in an aqueous medium.

Particle size distributions can be characterized by the D10, D50 and D90 measurements. In each case the number indicates the percentage amount of particles smaller than the recited value. In other words, a D90 of 100 microns means that 90% of the particles are smaller than 100 microns in diameter. By knowing a D10 and a D90, the range of particles in a distribution of particles can be defined. The characterization of the particle size of a sample by its D10 and D90 values generally defines the breadth of the particle-size distribution. The closer these values are, the narrower the distribution of particle sizes.

The particle size measurements necessary to obtain D10, D50 and D90 values of the CeZr mixed oxide sol and/or the particulate inorganic oxide can be obtained by Laser Diffraction Particle Size Analysis using a Malvern Mastersizer 3000, which is a volume-based technique (i.e. D50 and D90 may also be referred to as $D_V50$ and $D_V90$ (or D(v,0.50) and D(v,0.90)) and applies a mathematical Mie theory model to determine a particle size distribution. The laser diffraction system works by determining diameters for the particles based on a spherical approximation. For the particle size measurements by Laser Diffraction Particle Size Analysis, diluted samples were prepared by sonication in distilled water without surfactant for 30 seconds at 35 watts.

In some embodiments, the D90 of the CeZr mixed oxide sol may be less than 1.2 micron, or less than 1.1 micron, or less than 1.0 micron, or less than 900 nm, or less than 800 nm, or less than 700 nm, or less than 600 nm, or less than 500 nm, or less than 400 nm, or less than 300 nm.

In some other embodiments, the D90 of the CeZr mixed oxide sol may be between 1.2 micron and 1.3 micron, or between 1.1 micron and 1.2 micron, or between 1.0 micron and 1.1 micron, or between 900 nm and 1.0 micron, or between 800 nm and 900 nm, or between 700 nm and 800 nm, or between 600 nm and 700 nm, or between 500 nm and 600 nm, or between 400 nm and 500 nm, or between 300 nm and 400 nm, or between 200 nm and 300 nm, or between 100 nm and 200 nm.

The CeZr mixed oxide sol may have a D50 of between 100 nm and 700 nm, preferably between 200 nm and 600 nm, more preferably between 300 nm and 400 nm.

The particle size can also be characterized by obtaining a Z-average particle size of a sample. The Z average is the intensity weighted mean hydrodynamic size of the ensemble collection of particles measured by dynamic light scattering (DLS). The Z-average is derived from a cumulants analysis of the measured correlation curve, wherein a single particle size is assumed and a single exponential fit is applied to the autocorrelation function. The particle size measurements necessary to obtain Z-average particle size of the CeZr mixed oxide sol can be obtained by Dynamic Light Scattering Particle Size Analysis using a Malvern Zetasizer Nano. All tests are performed in a dilute aqueous medium where the harmonic mean hydrodynamic diameter of a sphere of equivalent diffusivity is determined by cumulants analysis of the time dependency of light scattered by randomly moving particles, in accordance with the Stokes-Einstein Equation.

The Z-average particle size of the CeZr mixed oxide sol is preferably between 150 nm and 350 nm, more preferably between 230 and 310 nm.

The first inorganic oxide support and the second inorganic oxide support can each be an oxide of Groups 2, 3, 4, 5, 13 and 14 elements. The inorganic oxide support is preferably a refractory oxide that exhibits chemical and physical stability at high temperatures, such as the temperatures associated with gasoline engine exhaust. The first inorganic oxide support and the second inorganic oxide support can each be selected from the group consisting of alumina, silica, titania, and mixed oxides or composite oxides thereof. More preferably, the inorganic oxide support is an alumina.

The inorganic oxide support such as alumina can be doped with a dopant. The dopant can be selected from the group consisting of La, Sr, Si, Ba, Y, Pr, Nd, Ce, and mixtures thereof. Preferably, the dopant is La, Ba, or Ce. Most preferably, the dopant is La. The dopant content in the inorganic oxide support can be from 1 to 30 wt %, preferably from 2 to 25 wt %, more preferably from 3 to 20 wt %.

The D50 of the first or the second inorganic material can be in the range of 0.1 to 100 μm, preferably in the range of 0.1 to 50 μm.

In some embodiments, the first inorganic oxide support is an alumina doped with La in an amount of from 2 to 25 wt %, more preferably from 3 to 20 wt %.

In some embodiments, the second inorganic oxide support is an alumina doped with La in an amount of from 2 to 25 wt %, more preferably from 3 to 20 wt %.

The OSC material and the inorganic oxide support in the first TWC coating or in the second TWC coating can have a weight ratio of from 10:1 to 1:10, preferably from 5:1 to 1:5, more preferably from 3:1 to 1:3.

In some embodiments, the second TWC coating loading comprises a barium component.

The first TWC coating and the second TWC coating are typically applied to the wall-flow filter substrate using a washcoat slurry. One suitable coating procedure is described in WO1999047260. The first TWC coating is coated from the first face (the inlet face). The second TWC coating is coated from the second face (the outlet face). Preferably, the second TWC coating is applied from the second face (the outlet face) before the first TWC coating is applied from the first face (the inlet face) of the wall-flow filter substrate.

After one or both the first TWC coating and the second TWC coating is applied to the wall-flow filter substrate, it may be preferable to dry and/or calcine the wall-flow filter substrate containing one coating before another coating is applied. Calcining may be preceded by a drying step at a lower temperature (such as 100 to 200° C.). Calcining is routine in the art and may be performed under usual conditions.

The first TWC coating preferably covers from 50% to 90%, more preferably from 60 to 80% of the length of the first plurality of channels.

The second TWC coating preferably covers from 30% to 70%, more preferably from 40 to 60% of the length of the second plurality of channels.

The first TWC coating and the second TWC coating may each be an in-wall coating, an on-wall coating, or a combination of in-wall and on-wall coating.

The first TWC coating loading can be in the range of 0.4 to 0.7 g/in$^3$, preferably 0.45 to 0.65 g/in$^3$. The first TWC coating loading is defined as the weight of the first TWC coating relative to the total volume of the wall-flow filter after calcination.

The second TWC coating loading can be in the range of 0.4 to 0.7 g/in$^3$, preferably 0.45 to 0.65 g/in$^3$.

The first TWC coating may have a total PGM loading in the range of 2 to 12 g/ft$^3$, preferably in the range of 3 to 10 g/ft$^3$, more preferably in the range of 4 to 8 g/ft$^3$.

The second TWC coating may have a total PGM loading in the range of 10 to 40 g/ft$^3$, preferably in the range of 15 to 30 g/ft$^3$, more preferably in the range of 20 to 25 g/ft$^3$.

Another aspect of the present disclosure is an emission treatment system for treating a flow of a combustion exhaust gas from gasoline direct injection engines, the system comprising the catalytic wall-flow filter as disclosed herein. The exhaust system can comprise additional components, such as a TWC catalyst containing a TWC composition applied to a honeycomb flow-through substrate and disposed either upstream or downstream of the catalytic wall-flow filter according to the invention.

Preferably the exhaust system comprises a TWC catalyst and the catalytic wall-flow filter as disclosed herein, wherein the TWC catalyst is upstream of the catalytic wall-flow filter.

The catalytic wall-flow filter is effective in reducing hydrocarbons, CO, NOx, and particulate emissions.

According to a further aspect, the invention provides a method of treating a combustion exhaust gas from a positive ignition internal combustion engine containing oxides of nitrogen, carbon monoxide, hydrocarbons, and particulate matter, which method comprising contacting the exhaust gas with the catalytic wall-flow filter as disclosed herein.

Example 1: GPF-1

A TWC washcoat slurry ("Slurry-A") was prepared by mixing rhodium nitrate, palladium nitrate, a CeZr mixed oxide sol having a weight ratio of $ZrO_2$ to $CeO_2$ of about 2:1 and a D90 of <1 μm, and a La-stabilized alumina component having a D90 of 5 μm, barium hydroxide, and water. The solid content was about 25%.

Slurry-A was coated from the outlet face of a cordierite wall-flow filter substrates (5.2×4 inch, 300/8, average mean pore size 15 microns, porosity 65%) using the coating process described in WO1999/47260. The outlet washcoat was about 55% of the substrate length and had a washcoat loading of 0.6 g/in$^3$ (after calcination). The outlet washcoat had a total PGM loading of 24 g/ft$^3$ with a Pd:Rh weight ratio of 47:1.

Another TWC washcoat slurry ("Slurry-B") was prepared by mixing rhodium nitrate, palladium nitrate, a CeZr mixed oxide sol having a weight ratio of $ZrO_2$ to $CeO_2$ of about 2:1 and a D90 of <1 μm, and a La-stabilized alumina component having a D90 of 5 μm, and water. The solid content was about 25%.

Slurry-B was coated from the inlet face of the above wall-flow filter substrate having the outlet channel coated already. The inlet washcoat was about 70% of the substrate length and had a washcoat loading of 0.6 g/in$^3$ (after calcination). Inlet washcoat had a total PGM loading of 6 g/ft$^3$ with a Pd:Rh weight ratio of 1:3.

The coated filter substrate was dried at 100° C. and calcined at 500° C. for 1 h. The total PGM loading of GPF-1 including the inlet coating and the outlet coating was 30 g/ft$^3$ with a Pd:Rh weight ratio of 5:1.

Comparative Example 2: GPF-2

A TWC washcoat slurry was prepared by mixing rhodium nitrate, palladium nitrate, a CeZr mixed oxide sol having a weight ratio of $ZrO_2$ to $CeO_2$ of about 2:1 and a D90 of <1 μm, and a La-stabilized alumina component having a D90 of 5 μm, barium hydroxide, and water. The solid content was 24%. The coating was applied from each end of a cordierite wall-flow filter substrates (5.2×4 inch, 300/8, average mean pore size 15 microns, porosity of 65%) using the coating process described in WO1999/47260. The coating length from each face was about 58% of the total substrate length. The amounts of washcoat slurry applied to the inlet channels and the outlet channels are the same. The coated filter substrate was dried at 100° C. and calcined at 500° C. for 1 h. The coated catalytic filer had a washcoat loading of 1.6 g/in$^3$ that includes 1.2 g/in$^3$ CeZr mixed oxide and 0.4 g/in$^3$ La-stabilized alumina component. The PGM loading of GPF-2 was 30 g/ft with a Pd:Rh weight ratio of 5:1.

Example 3: Performance Test

Each of GPF-1 and GPF-2 was engine aged at closed coupled position behind a TWC catalyst using an engine bench ageing cycle with the bed temperature controlled to 1050° C. for 120 hours. Each filter was installed in an underfloor position on a 2018 MY 2.0 L passenger car with a direct injection gasoline engine. Each filter was evaluated over a minimum of three RDE-aggressive cycles with a cold start, measuring reduction in gaseous emissions relative to the reference catalyst. The backpressure differential and the conversion efficiency for gaseous HC, CO and $NO_x$ emissions were determined by using sensors mounted upstream and downstream of the filter as well as upstream and downstream of the closed coupled TWC. The results presented in Table 1 below show that GPF-1 gave lower level of $NO_x$ emissions as compared to GPF-2.

Furthermore, SCAT reactor ageing was performed on cores (1×4") of GPF-1 and GPF-2 at 1000° C. using a 4-mode ageing cycle. SCAT reactor performance evaluation of the aged cores showed a significant difference in $NO_x$ light off as shown in Table 1.

TABLE 1

| Filter | NOx emissions (g/mile) | NOx light off T50 (° C.) |
|---|---|---|
| GPF-2 (Comparative Example) | 0.14 | 305 |
| GPF-1 | 0.1 | 270 |

The invention claimed is:

1. A catalytic wall-flow filter for exhaust gas from a gasoline engine, the catalytic wall-flow filter comprising:
   a wall-flow filter substrate having porous walls and having a first face and a second face defining a longitudinal direction therebetween and first and second pluralities of channels extending in the longitudinal direction, wherein the first plurality of channels is open at the first face and closed at the second face, and wherein the second plurality of channels is open at the second face and closed at the first face;
   a first TWC coating in the first plurality of channels, the first TWC coating comprising a first PGM composition, a first oxygen storage capacity (OSC) material, and a first inorganic support;
   a second TWC coating in the second plurality of channels, the second TWC coating comprising a second PGM composition, a second OSC material, and a second inorganic support;

wherein the first PGM composition comprises rhodium in an amount of 50 to 95 wt % relative to the total weight of the first PGM composition;

wherein the second PGM composition comprises palladium in an amount of 90 to 99 wt % relative to the total weight of the second PGM composition;

wherein the first TWC coating is coated from the first face;

wherein the second TWC coating is coated from the second face;

wherein the first face is an inlet face and the second face is an outlet face of the catalytic wall-flow filter.

2. The catalytic wall-flow filter of claim 1, wherein the first PGM composition comprises Rh and Pd.

3. The catalytic wall-flow filter of claim 1, wherein the first PGM composition comprises Rh in an amount of 70 to 80 wt % relative to the total weight of the first PGM composition.

4. The catalytic wall-flow filter of claim 1, wherein the second PGM composition comprises Rh and Pd.

5. The catalytic wall-flow filter of claim 1, wherein the second PGM composition comprises palladium in an amount of 93 to 96 wt % relative to the total weight of the second PGM composition.

6. The catalytic wall-flow filter of claim 1, wherein each of the first OSC material and the second OSC material independently comprises an OSC derived from a CeZr mixed oxide sol having a D90 of less than 1.3 micron.

7. The catalytic wall-flow filter of claim 1, wherein the first inorganic support is an alumina doped with La in an amount of from 3 to 20 wt %.

8. The catalytic wall-flow filter of claim 1, wherein the second inorganic support is an alumina doped with La in an amount of from 3 to 20 wt %.

9. The catalytic wall-flow filter of claim 1, wherein the first TWC coating covers from 60 to 80% of the length of the first plurality of channels.

10. The catalytic wall-flow filter of claim 1, wherein the second TWC coating covers from 40 to 60% of the length of the second plurality of channels.

11. The catalytic wall-flow filter of claim 1, wherein the first TWC coating loading is in the range of from 0.45 to 0.65 g/in$^3$.

12. The catalytic wall-flow filter of claim 1, wherein the first TWC coating has a total PGM loading in the range of from 4 to 8 g/ft$^3$.

13. The catalytic wall-flow filter of claim 1, wherein the second TWC coating loading is in the range of from 0.45 to 0.65 g/in$^3$.

14. The catalytic wall-flow filter of claim 1, wherein the second TWC coating has a total PGM loading in the range of from 20 to 25 g/ft$^3$.

15. An emission treatment system for treating a flow of a combustion exhaust gas from gasoline direct injection engines, the system comprising the catalytic wall-flow filter of claim 1.

16. The emission treatment system of claim 15, further comprising a TWC catalyst containing a TWC composition applied to a honeycomb flow-through substrate.

17. The emission treatment system of claim 16, wherein the TWC catalyst is disposed upstream of the catalytic wall-flow filter.

18. A method of treating a combustion exhaust gas from a positive ignition internal combustion engine containing oxides of nitrogen, carbon monoxide, hydrocarbons, and particulate matter, which method comprising contacting the exhaust gas with the catalytic wall-flow filter of claim 1.

* * * * *